United States Patent [19]

Lindén

[11] Patent Number: 5,016,729

[45] Date of Patent: May 21, 1991

[54] EXHAUST SYSTEM FOR COMBUSTION ENGINE

[76] Inventor: Claes Lindén, Arrud, S-710 27 Dyltabruk, Sweden

[21] Appl. No.: 438,408

[22] PCT Filed: Jun. 17, 1988

[86] PCT No.: PCT/SE88/00337

§ 371 Date: Dec. 18, 1989

§ 102(e) Date: Dec. 18, 1989

[87] PCT Pub. No.: WO88/10361

PCT Pub. Date: Dec. 29, 1988

[30] Foreign Application Priority Data

Jun. 18, 1987 [SE] Sweden ................................ 8702564

[51] Int. Cl.⁵ ................................................ F01N 7/10
[52] U.S. Cl. ........................................ 181/240; 60/313
[58] Field of Search ............... 181/240, 250, 251, 264, 181/268, 269, 273, 222, 404; 60/312, 313, 314

[56] References Cited

U.S. PATENT DOCUMENTS

| | | |
|---|---|---|
| 2,166,670 | 7/1939 | Martin .................................. 181/268 |
| 2,544,284 | 3/1951 | Stephens et al. ..................... 181/251 |
| 3,958,660 | 5/1976 | Boor .................................... 181/269 |
| 4,128,769 | 12/1978 | Bons et al. ....................... 181/222 X |
| 4,225,011 | 9/1980 | Taguchi .............................. 181/269 |
| 4,449,608 | 5/1984 | Hirata et al. .................... 181/240 X |
| 4,645,032 | 2/1987 | Ross et al. .......................... 181/250 |

Primary Examiner—Brian W. Brown
Attorney, Agent, or Firm—Sughrue, Mion, Zinn, Macpeak and Seas

[57] ABSTRACT

An exhaust outlet conduit for internal combustion engines and adapted to function as a resonator for exhaust waves exiting from the cylinder or cylinders to which the conduit is connected. The conduit (4) is characterized by a combination of features, according to which the conduit exhibits an exhaust throughflow area which increases outwardly from the end of the conduit connected to the cylinder (1), and the conduit wall has provided therein one or more openings (5). The openings are so configured that the total opening area increases along the conduit in a direction away from the cylinder (1), so as to increase the frequency range over which the conduit (4) will function as a resonator.

10 Claims, 2 Drawing Sheets

EXHAUST SYSTEM FOR COMBUSTION ENGINE

BACKGROUND OF THE INVENTION

The present invention relates to an exhaust outlet conduit intended for internal combustion engines and constructed to function as a resonator for the exhaust waves exiting from the cylinder or cylinders to which it is connected.

The resonance phenomenon in exhaust outlet conduits of an internal combustion engine has a significant effect on engine power, engine efficiency and fuel consumption. Consequently, it is normal practice in present times to select conduit diameters and conduit lengths which enable said conduits to function as quarter-wave resonators at a given engine speed, determined by the type of engine concerned and the use for which it is intended. The engine speed at which resonance is desired differs considerably between a car engine for normal use and an engine used in high-speed motor cycle competitions.

By utilizing the resonant phenomenon in the exhaust outlet conduit, which gives rise to a standing wave in the conduit, it is possible to improve considerably the filling of the cylinder of, e.g., a four-stroke engine, since it is possible in this way to engender an underpressure in the exhaust port at that time when both the suction valve and the exhaust valve are open, thereby assisting in the removal by suction of residual exhaust gases and the introduction of fresh gases through the suction port before the exhaust valve closes.

The same conditions prevail in principle in two-stroke engines, although such engines are more sensitive and normally require a counter-pressure wave to be fed back through the exhaust conduit, in order to prevent the fuel mixture from escaping through the exhaust port at the end of the overlapping exhaust and overflow phases.

The afore described effect capable of being achieved with standing waves in the exhaust outlet conduit has a great significance on engine performance. For example, when engendering an underpressure in the vicinity of the exhaust port at the end of the exhaust stroke, in accordance with the aforegoing, the residual, combustion gases which are not ejected by the piston and thus remain in the cylinder are sucked out from the cylinder and, furthermore, as a result of the aforesaid overlap between the times at which the exhaust valve and suction valve are open, the cylinder will be filled with a fresh fuel mixture prior to the occurrence of suction generated by downward movement of the piston.

This technique is employed, for instance, in speedway motor cycles, in which the exhaust outlet conduit is given a funnel shape in order to improve its evacuating effect. This enables a relatively high power output to be obtained at maximum engine speeds. The sound level of the engine, however, is very high and at times unacceptably so.

In addition to minimizing the amount of fresh fuel mixture that is lost through the exhaust outlet port, it is also possible when utilizing the aforesaid counterpressure wave in two-stroke engines to feed back the fuel mixture pressed out from the cylinder therewith achieving further supercharging of the cylinder.

Thus, there are utilized the natural resonance oscillations of the air column present in the exhaust outlet conduit, which therewith functions as a quarter-wave resonator. One serious drawback with this arrangement, however, is that resonance is only reached at a specific engine speed and odd multiples thereof. Consequently, it is possible to achieve optimum engine performance only at one single engine speed, the resonance effect being greatly impaired immediately the engine is driven at a different speed to this single speed. Resonators can also give rise to a countereffect outside the resonance range.

Consequently, in the case of sound damping constructions it has been proposed to use exhaust outlet conduits provided with slot-like openings in the conduit wall, see for instance FR No. 536 812, DE No. 26 41 01 and DE No. 21 46 842. These slots normally have a widest part which faces the cylinder, although the reverse may also be the case.

The present invention is based on the concept that the speed range of an internal combustion engine over which the exhaust outlet conduit can function as a power-enhancing resonator can be increased considerably by incorporating a slot or a row of holes in the conduit, provided that the slot or the row of holes is so configured that the total opening area increases along the conduit in a direction away from the cylinder.

When provided with one or more openings having an increasing area in accordance with the above, a conduit which functions as a quarter-wave resonator at a given lowest fundamental frequency will also function as a resonator at higher frequencies, since the length of the resonant part of the conduit decreases such that, seen from an oscillating aspect, the end of the conduit will appear to move, in an illusory fashion, along the opening or openings in a direction towards the cylinder at increasing frequency.

In this way, the power-increasing effect of the resonance phenomenon in the exhaust outlet conduit can be utilized over an extensive range of engine speed, which is highly beneficial both from the aspect of economy and of performance.

The drawbacks with the above described construction are that the evacuation performance of this construction is lower than that of a funnel-shaped conduit and that the same distinctive resonance effect obtained at maximum engine speed when using a funnel-shaped conduit cannot be obtained with the aforedescribed embodiment.

SUMMARY OF THE INVENTION

An object of the present invention is to provide an exhaust outlet conduit which will function efficiently as a resonator while retaining good evacuation performance over a relatively wide range of engine speed. Another object is to provide such a conduit which will produce a highly distinctive resonance effect at top engine speeds, i.e. the speed at which maximum power is obtained.

The first object is achieved with the aid of a funnel-shaped conduit having provided therein a slot or row of holes whose area increases in the flow direction, whereas the second object is achieved by providing the conduit wall with a larger opening at a position corresponding to the resonance length at said top engine speed.

An exhaust outlet conduit of the kind described in the introduction is particularly characterized in that the exhaust-gas throughflow area of the conduit increases from the end of the conduit connected to the cylinder and outwardly from said end; and in that the conduit wall has provided therein one or more openings which are so configured that the total opening area increases along the conduit in a direction away from the cylinder, such as to extend the frequency range over which the conduit will function as a resonator.

Preferably, the resonant part of the conduit will have a length which enables the conduit to function as a quarter-wave resonator at the lowest cylinder speed at which resonance is desired. Furthermore, the throughflow area will preferably increase linearly with distance from the cylinder.

The conduit is preferably provided with at least one slot-like opening which extends substantially in the longitudinal direction of the conduit and the width of which increases in a direction away from the cylinder. The slot width may either increase linearly with distance away from the cylinder or exponentially with said distance.

In accordance with one particularly preferred embodiment, the apex of the slot-like opening has located adjacent thereto an opening of greater area than the area of the first part of the slot formed in the conduit wall. This opening is conveniently located at a distance from the cylinder which provides resonance at the engine speed at which maximum power is obtained.

The slot preferably discharges at the end of the resonance conduit and the length of the slot is preferably such as to enable the conduit to function as a quarter-wave resonator up to a frequency which is at least three times as high as the frequency which corresponds to the lowest engine speed at which resonance is desired.

As an alternative to the use of one or more slots, the conduit may be, for instance, configured with at least one row of holes extending substantially in the longitudinal direction of the conduit, these holes having a total opening area which increases in a direction away from the cylinder, wherein a hole of greater area than the firstmentioned hole in said row is provided adjacent the beginning of said row.

BRIEF DESCRIPTION OF THE DRAWINGS

The invention will now be described in more detail with reference to the accompanying highly schematic drawings, which illustrate a number of selected exemplifying embodiments of the invention.

DETAILED DESCRIPTION OF THE PREFERRED EMBODIMENTS

Figure 1:
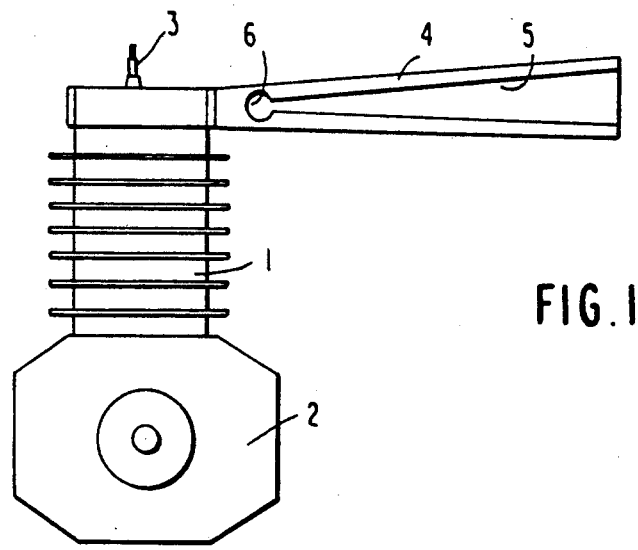
FIG. 1 illustrates schematically a cylinder provided with an inventive exhaust outlet conduit.

In FIG. 1 the reference numeral 1 identifies a cylinder of an internal combustion engine having a crank housing 2. A spark plug 3 is mounted at the top of the cylinder. The exhaust port of the cylinder 1 is connected to an exhaust outlet conduit 4, which for the purpose of achieving good evacuation of the exhaust gases has an exhaust throughflow area which increases from the cylinder and outwards.

As mentioned in the introduction, the conduit 4 is to function as a quarter-wave resonator over the greatest possible range of engine speed, in order to improve the performance and economy of the engine. Accordingly, in accordance with the invention, the exhaust outlet conduit is provided with an axially extending slot 5 whose width increases along the conduit in a direction away from the cylinder 1. In the case of the illustrated example, the conduit 4 has a slot whose width increases linearly in dependence on the distance from the cylinder. The slot 5, which opens out at the end of the conduit 4, causes the resonant part of the conduit to change in dependence on the frequency of the pulsating exhaust flow, so that the end of the conduit, from an oscillating aspect, will appear to move along the slot, in an illusory fashion. The resonance phenomenon is achieved, in this way, within a larger frequency range than that achieved with a conduit in which no such slot is provided, but while retaining a good evacuating effect, as a result of the configuration of the conduit.

On the other hand, part of the distinctive resonance effect obtained with an imperforate conduit for the frequency at which the conduit length corresponds exactly to a one-quarter wave length is lost. Consequently, in order to retain the powerful and distinctive resonance effect at a frequency, corresponding to top engine speed, while safeguarding the wide resonance range, an opening 6 is provided in the conduit wall at a position corresponding to a quarter-wave length at said top engine speed. As a result of this opening 6, the engine when running at said top speed will regard the conduit as being severed substantially at the opening 6 and hence the conduit will have the same effect as a short conical conduit with no slot. This enables maximum power to be obtained while making it easier for the engine to maintain a corresponding engine speed.

In accordance with the aforegoing, the length of the conduit shall be such as to enable the conduit to function as a quarter-wave resonator at the lowest engine speed at which resonance is desired. At higher engine speeds, and therewith higher frequencies of the air oscillations, i.e. the standing waves in the conduit, the resonant length of the conduit will be shortened and the end of the conduit will apparently move towards the cylinder, in accordance with the aforegoing. Thus, it is possible in this way to obtain standing waves in the conduit for achieving the desired pressure condition adjacent the exhaust port over a wide range of engine speed. A particularly noticeable resonance effect is obtained at top engine speed as a result of the presence of the opening 6. Tests carried out with the arrangement illustrated in FIG. 1 have confirmed that the performance of an engine is greatly improved over a wide range of speed when using a resonator according to the aforegoing with varying resonance frequency while maintaining a substantially unchanged top output as a result of the presence of the opening 6. Because of the funnel-shape of the conduit, substantially the same evacuating performance is obtained as that achieved with an imperforate conduit, i.e. a conduit with no slot.

The level of noise produced by the earlier used imperforate funnel-shaped conduits, however, is fully unacceptable in many cases. In the case of the inventive slotted conduit, however, the major part of the high-frequency content of the sound wave is propagated at right angles to the slot, and consequently the conduit will also provide a substantial sound damping effect. This sound damping effect can be further improved by means of the embodiment illustrated in FIG. 2, said figure showing schematically a unit which functions as a combined resonant exhaust conduit and silencer and which is intended particularly for use with speedway motor cycles.

Figure 2:
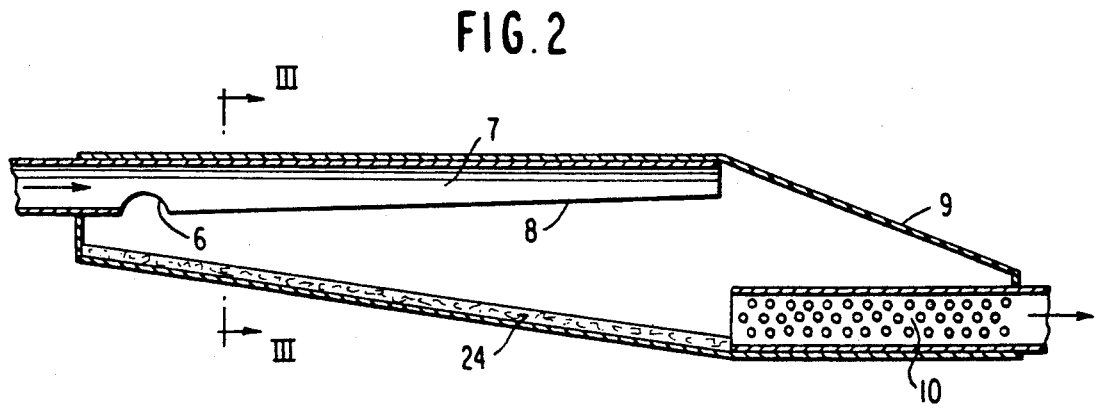
FIG. 2 is an axial section through an inventive exhaust outlet conduit arranged in a sound damping arrangement, or silencer.

The FIG. 2 embodiment comprises a funnel-shaped exhaust outlet conduit 7 corresponding to the conduit 4 in FIG. 1, having a downwardly directed slot 8 whose width increases along the conduit 7. The conduit is open at its outer end, i.e. the right end in FIG. 2, whereas the left end of the conduit is connected to a cylinder of an internal combustion engine.

The conduit 7 is enclosed in a casing 9 having substantially the form of a double cone. The casing 9 is provided with a sound absorbing material 24, such as glass wool or rock wool, on its inner surface opposite the slot 8. The exhaust gases depart from the casing 9 through a conventionally perforated silencer conduit 10.

Figure 3:
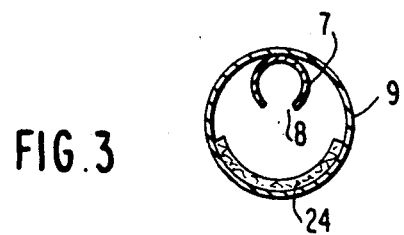
FIG. 3 is a sectional view through the arrangement shown in FIG. 2, taken on the line III—III.

FIG. 3 is a sectional view taken on the line III—III in FIG. 2.

An arrangement constructed in accordance with FIGS. 2 and 3 will produce a high damping effect while maintaining the engine performance substantially unchanged, enabling the new noise limits placed on speedway motor cycles to be complied with.

The inventive exhaust outlet conduit construction has also been found highly insensitive to the construction of any subsequent conduit system or pipes, which is highly beneficial, inter alia, in the case of automobile applications.

When applying the present invention, it is important that the configuration and length of the slot and the conicity of the conduit are tuned to the engine, which also applies to the position of the resonator in the exhaust system. Such tuning can be readily carried out by the skilled person on any occurring type of engine. Although not fully established, it is assumed that the exceedingly good function of the inventive exhaust outlet conduit is due fundamentally to favourable co-action between sound and pressure waves in the system.

Figure 4:
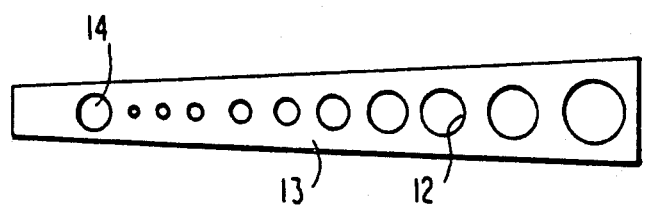
FIG. 4 illustrates schematically an alternative embodiment of an inventive exhaust outlet conduit.

Instead of being provided with slots in accordance with the FIG. 1 embodiment, the resonators may incorporate one or more rows of holes 12, such as the holes in the exhaust outlet conduit 13 of the FIG. 4 embodiment, these holes increasing in size along the conduit in a direction away from the cylinder. As an alternative to holes of varying size, the holes or perforations may be of mutually the same size, exhibiting constant area, and the density of the holes, i.e. the spacing therebetween, varied instead. At least one larger hole 14 is provided at the beginning of the row of holes, this larger hole corresponding to the enlarged opening 6 at the beginning of the slot 5 of the FIG. 1 embodiment.

Since a quarter-wave resonator is resonant at its fundamental frequency and at odd multiples of said frequency, the length of the slot for the row of holes is selected so that the conduit will be resonant over a frequency range which corresponds to at least three times the fundamental frequency. The conduit then again becomes resonant over the whole of its length.

Figure 5:
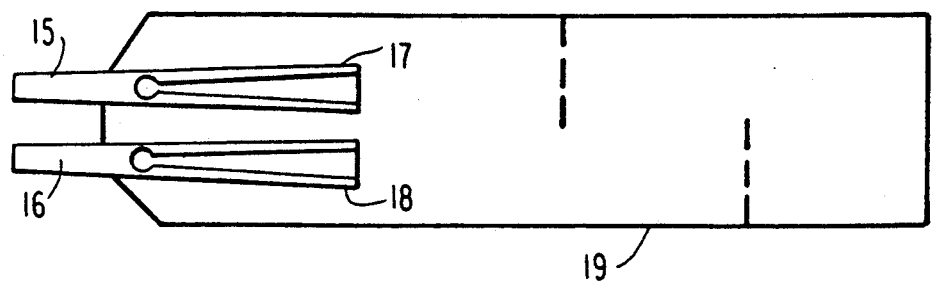
FIG. 5 illustrates schematically the exhaust outlet conduits from two cylinders introduced into a sound dampening arrangement, or silencer.

FIG. 5 illustrates an embodiment in which exhaust outlet conduits 15 and 16 incorporating slots 17 and 18 respectively extend from two cylinders, each of the conduits being arranged in a schematically illustrated silencer 19. When using exhaust outlet conduits constructed in accordance with the invention, these conduits being resonant over a wide engine speed a substantial sound damping effect is obtained automatically, however, such that in those cases where two silencers have previously been used said silencers can be replaced with a single silencer.

Figure 6:
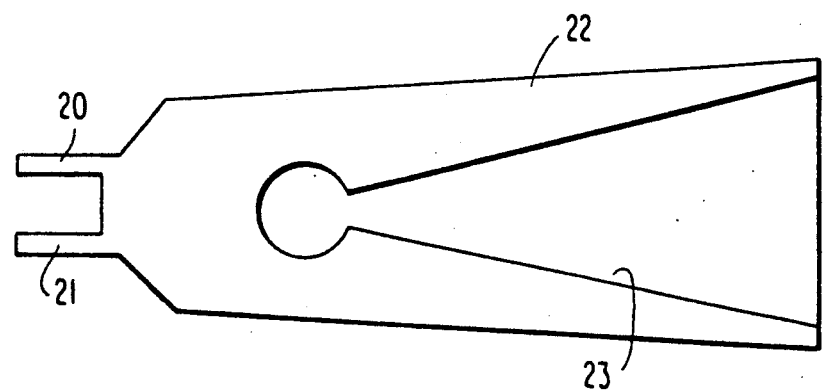
FIG. 6 illustrates the exhaust outlet tubes from two cylinders discharging into a resonant manifold or header.

FIG. 6 illustrates an embodiment in which two exhaust outlet conduits 20 and 21 having imperforate walls open into a conical header or collector 22 which functions as a resonator and which is provided with a slot 23 of increasing width in order to be resonant over a wide frequency range. It will be understood, that more than two conduits can be connected to a common collector. The slot may also be replaced with holes or the like.

The sizes of the openings 6 and 14 of respective embodiments illustrated in FIG. 1 and FIG. 4 are selected in dependence on the field of use. A very large opening will produce essentially the same effect as a cut-off conduit, i.e. very good resonance effects at top speeds and a poorer effect at low speeds. A smaller opening will improve the resonance effect at low speeds, at the cost of the resonance effect at top power. Practical tests, however, have shown that it is possible to compromise between these mutually counteracting effects with good results.

The afore described embodiments are not restrictive of the invention, since they can be modified in several respects within the scope of the following claims. For example, a multiple of slots or hole rows can be combined and several larger openings or widenings may optionally be arranged at the beginning of respective slots or hole rows or at desired locations therealong, these locations corresponding to the resonance point of the wave length for the engine speed for which the best resonance effect is sought. Both slots and conduit have been shown to have a conically widening width and diameter respectively. This increasing width and diameter respectively may also be exponential, for example contingent on the square of the distance from the cylinder. Although the present invention has been described in conjunction with exhaust outlet conduits for four-stroke engine, it will be understood that the inventive principle can also be applied to suction conduits and, subsequent to given modification, also to two-stroke engines.

I claim:

1. An exhaust outlet conduit for an internal combustion engine, characterized by: the conduit (4; 7; 13; 15; 16; 22) having an exhaust through flow area which increases outwardly from an end portion of the conduit connected to a cylinder (1) of the engine such that said conduit functions as a resonator for exhaust waves exiting from said cylinder, and a wall of said conduit having one or more openings (5; 8; 12; 17; 18; 23) so configured that a total opening area increases along the conduit outwardly from a point on said end portion of the conduit connected to the cylinder, so as to increase a frequency range over which the conduit functions as a resonator.

2. A conduit according to claim 1, wherein a resonant part of the conduit (4; 7; 13; 15; 16; 22) has a length such as to enable the conduit to function as a quarter-wave resonator at a lowest cylinder speed for which resonance is desired.

3. A conduit according to claim 1 or 2, wherein the throughflow area increases linearly with distance from the cylinder (1).

4. A conduit according to claim 1, wherein said conduit (4; 7; 15; 16; 22) is provided with at least one slot-like opening (5; 8; 17; 18; 23) which extends in a longitudinal direction of the conduit and which has a width which increases from said point in a direction away from the cylinder (1).

5. A conduit according to claim 4, wherein the width of the slot (5; 8; 17; 18; 23) increases linearly with distance from the cylinder (1).

6. A conduit according to claim 4 or 5, wherein an opening (6) of larger area than the first part of a slot formed in the conduit wall is provided in front of an apex of the slot-like opening (5; 8; 17; 18; 23).

7. A conduit according to claim 6, wherein the opening (6) of larger area is located at a distance from the cylinder (1) which will provide resonance at a speed at which maximum power is achieved.

8. A conduit according to claim 4, wherein the slot (5; 8; 17; 18; 23) opens out at an end of the resonance conduit (4; 7; 15; 16; 22).

9. A conduit according to claim 4, wherein the slot (5; 8; 17; 18; 23) has a length such that the conduit (4; 7; 15; 16; 22) is able to function as a quarter-wave resonator up to a frequency which is at least three times greater than a frequency corresponding to a lowest cylinder speed at which resonance is desired.

10. A conduit according to claims 1 or 2, wherein the conduit (13) is configured with at least one row of holes which extends substantially in a longitudinal direction of the conduit and which has a total opening area which increases from said point in a direction away from the cylinder (1); and a hole (14) of larger area than a first hole (12) in said row is provided in front of a position at which said hole row begins.

* * * * *